(12) United States Patent
Odashima

(10) Patent No.: US 8,326,454 B2
(45) Date of Patent: Dec. 4, 2012

(54) POWER ASSIST APPARATUS, AND ITS CONTROL METHOD

(75) Inventor: Tadashi Odashima, Owariasahi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 465 days.

(21) Appl. No.: 12/668,986

(22) PCT Filed: Jul. 25, 2008

(86) PCT No.: PCT/JP2008/063827
§ 371 (c)(1),
(2), (4) Date: Jan. 13, 2010

(87) PCT Pub. No.: WO2009/017215
PCT Pub. Date: Feb. 5, 2009

(65) Prior Publication Data
US 2010/0185321 A1    Jul. 22, 2010

(30) Foreign Application Priority Data

Jul. 31, 2007 (JP) .................................. 2007-200076

(51) Int. Cl.
*G06F 7/00* (2006.01)
*G06F 19/00* (2006.01)
*G05B 15/00* (2006.01)
*G05B 19/00* (2006.01)

(52) U.S. Cl. ........ 700/230; 700/258; 700/264; 700/245; 700/250; 700/262; 901/28; 901/42

(58) Field of Classification Search .................. None
See application file for complete search history.

(56) References Cited

U.S. PATENT DOCUMENTS

| 4,086,522 A * | 4/1978 | Engelberger et al. ..... 318/568.13 |
| 2009/0289591 A1 * | 11/2009 | Kassow et al. ........... 318/568.13 |

FOREIGN PATENT DOCUMENTS

JP    08-282998 A    10/1996
(Continued)

OTHER PUBLICATIONS

Office Action issued in the corresponding Japanese Patent Application No. 2007-200076 and English translation.

*Primary Examiner* — Gene Crawford
*Assistant Examiner* — Yolanda Jones
(74) *Attorney, Agent, or Firm* — Kenyon & Kenyon LLP

(57) ABSTRACT

Provided are a power assist apparatus and its control method, which realize improvements in positioning precision and in workability while reducing the burden of a work positioning operation on a operator by burdening a portion of the positioning work on the power assist apparatus and while making good use of the decision or experience (or institution or knack) by the operator when the operator positions the work by using the power assist apparatus. The power assist apparatus thus autonomously cooperated with the working action of the operator comprises a transfer tool including an articulated robot, a sucking jig and a free joint for gripping and transferring windows, and a control device for controlling the actions of the transfer tool. The control device divides and stores a series of working tasks into a plurality of working section, and sets control logics for the individual working sections and for the individual working directions, in which the power assist apparatus has degrees of freedom.

9 Claims, 5 Drawing Sheets

FOREIGN PATENT DOCUMENTS

| | | |
|---|---|---|
| JP | 10-187221 A | 7/1998 |
| JP | 10-231100 A | 9/1998 |
| JP | 11-245124 | 9/1999 |
| JP | 2005-028492 A | 2/2005 |
| JP | 2007-076807 A | 3/2007 |
| JP | 2008-036777 A | 2/2008 |
| JP | 2008-126888 A | 6/2008 |
| JP | 2008-213119 A | 9/2008 |

* cited by examiner

FIG. 3

|  | Section 1 | Section 2 | Section 3 |
|---|---|---|---|
| X translation | Canceled | Operator's Operation + Power Assist | Operator's Operation |
| Y translation | Canceled | Canceled | Operator's Operation |
| Z translation | Automatically Down | Automatically Down | Operator's Operation |
| Roll | Canceled by Brake 4a | Canceled by Brake 4a | Operator's Operation |
| Pitch | Canceled by Brake 4a | Automatically Rotate | Operator's Operation |
| Yaw | Canceled by Brake 4a | Canceled by Brake 4a | Operator's Operation |
| Control | Automatically | Semi-automatically | Manual |

FIG. 5

|  | Section 1 | Section 2 | Section 3 |
|---|---|---|---|
| X translation | Canceled | Operator's Operation + Power Assist | Canceled |
| Y translation | Canceled | Canceled | Canceled |
| Z translation | Automatically Down | Automatically Down | Canceled |
| Roll | Canceled by Brake 4a | Canceled by Brake 4a | Canceled by Brake 4a |
| Pitch | Canceled by Brake 4a | Automatically Rotate | Operator's Operation + Power Assist |
| Yaw | Canceled by Brake 4a | Canceled by Brake 4a | Canceled by Brake 4a |
| Conrtol | Automatically | Semi-automatically | Semi-automatically |

POWER ASSIST APPARATUS, AND ITS CONTROL METHOD

This is a 371 national phase application of PCT/JP2008/063827 filed 25 Jul. 2008, claiming priority to Japanese Patent Application No. 2007-200076 filed 31 Jul. 2007, the contents of which are incorporated herein by reference.

FIELD OF THE INVENTION

The present invention relates to the technique of a power assist apparatus, in detail, control method thereof for conveying a work and setting accurately the work by the power assist apparatus.

BACKGROUND OF THE INVENTION

Conventionally, in the manufacturing process of the industrial product, a power assist apparatus is used as an apparatus assisting an operator in conveying and assembling a work (a heavy work). For example, the workflow of assembling the work includes the following workflows; conveying the work; and setting the work. Conveying the work cooperated with the apparatus, the operator can give the burden conveying the work to the apparatus, and can set the work efficiently after teaching the information involving the conveying route and the assembling position to the apparatus. Thus, the purposes of using the apparatus are reducing the operator's working burden and improving the workability.

For example, as the power assist apparatus, JP-H11-245124-A discloses the work lifting apparatus detecting the inclination of a holder holding the work and lifting the holder to set the inclination to the reference inclination set in advance.

According to these conventional apparatuses, the operator's working burden can rightly be reduced with respect to the conveying the work. However, depending on only the apparatus when setting the work, the variable position of assembling object causes the setting failure of the work.

The objective of the present invention is to provide an unexpected power assist apparatus and its control method, enabled to reduce the operator's working burden and to improve the setting precision and the workability, when the operator sets the work by using the apparatus, giving a part of the operator's working burden of setting the work to the apparatus, making good use of the operator's decision or experience.

DISCLOSURE OF THE INVENTION

A power assist apparatus of the first aspect of the present invention, includes a conveyor for holding and conveying a work and a controller for controlling the conveyor, holds the work by the conveyor, controls autonomously the conveyor by the controller cooperated with an operator's operation, in which the controller memorizes a route of conveying the work by the conveyor, divides the route into multiple workflow sections, and controls an action of the conveyor in directions where the conveyor works freely in the workflow sections.

In the preferable embodiment of the power assist apparatus of the present invention, further included a limit device limiting the action of the conveyor in the directions where the conveyor works freely, in which the limit device is connected to the controller and is controlled by the controller.

A control method of the second aspect of the present invention, uses a power assist apparatus, holding a work by a conveyor, conveying autonomously the work cooperated with an operator's operation; the method includes dividing routes for conveying the work by the conveyor into multiple workflow sections and memorizing the divided workflow sections and setting a control logic for controlling the directions of the workflow sections where the apparatus works freely.

In the preferable embodiment of the control method of the present invention, the control logic includes permissions whether the operator's operation is canceled and whether autonomous action of the power assist apparatus is canceled.

Mentioned above, due to the present invention, according to dividing the workflow properly, the apparatus can be properly controlled in the section of the setting workflow where making good use of the operator's decision or experience and the workflow where the apparatus is desired to assist, thereby reducing the operator's burden of conveying and setting the work.

Thus, the power assist apparatus and its control method can be provided, enabled to reduce the operator's working burden and to improve the setting precision and the workability.

BRIEF DESCRIPTION OF THE DRAWING

FIG. 3 is a matrix view showing a control method of a power assist apparatus in a section by a direction in a series of the workflow assembling a rear window.

FIG. 5 is a matrix view showing a control method of a power assist apparatus in a section by a direction in a series of the workflow assembling a front window.

THE BEST MODE FOR CARRYING OUT THE INVENTION

As follows, a power assist apparatus 1 is described. The apparatus 1 assists a operator in assembling windows 10, 20 to frames (not shown) of a vehicle body 11.

Figure 1:
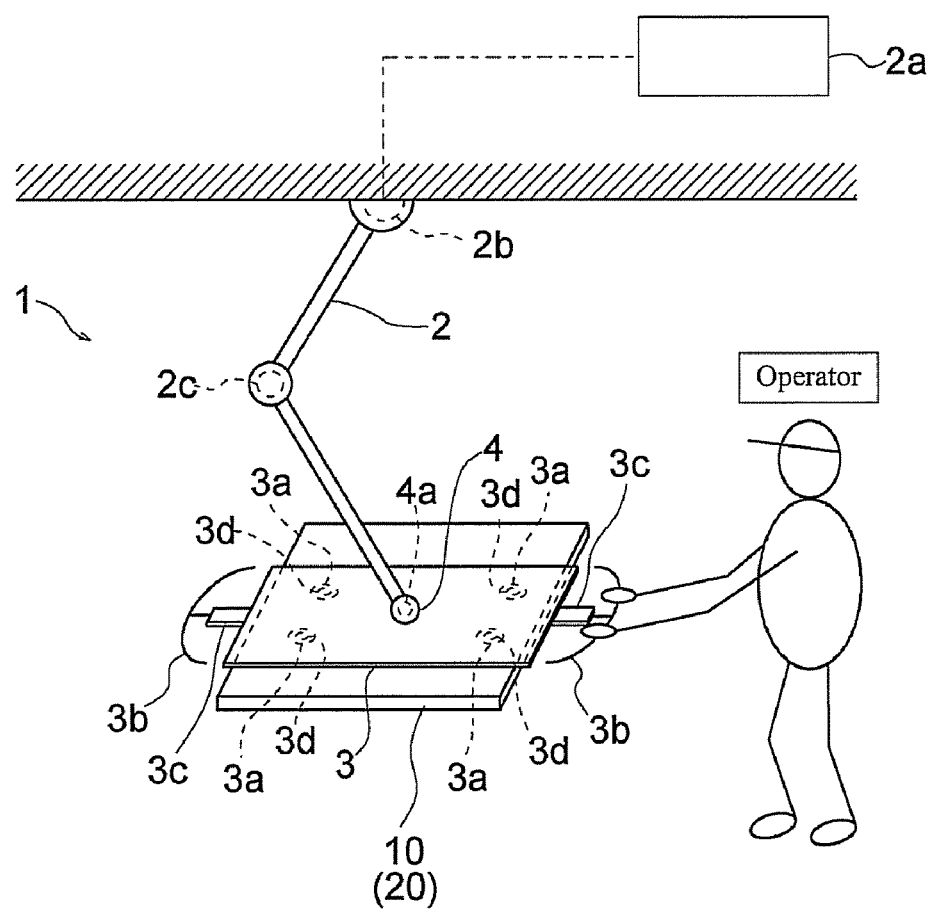
FIG. 1 is a schematic view showing a power assist apparatus.

As shown in FIG. 1, the apparatus 1 includes a polyarticular robot 2, a suction jig 3, a free joint 4.

The robot 2 includes a controller 2a, motors 2b, 2c. The motors 2b, 2c are disposed at the joints of the robot 2. The robot 2 is fixed to the ceiling or the like, also is supported to travel above the assembling object by a hoister or the like. The robot arm of the apparatus 1 is not especially limited to the polyarticular robot 2, other robot arms may be used.

The jig 3 includes pads 3a, 3a, handles 3b, 3b, force sensors 3c, 3c, pressure sensors 3d, 3d, and the jig 3 is provided with the robot 2 through the joint 4. The jig 3 absorbs and holds the windows 10, 20 as conveying objects with pads 3a, 3a. The handles 3b, 3b as the operator's holding portions are coupled with the jig 3 through the sensors 3c, 3c. The sensors 3c, 3c are connected to the controller 2a.

Load cells measuring six-component force are used as the sensors 3c, 3c, and the sensors 3c, 3c can detect the operating direction, force and so on, when the operator operates the jig 3 to the desired direction with holding the handles 3b, 3b.

The pads 3a, 3a include the sensor 3d, 3d detecting the pressure from the windows 10, 20 absorbed and held. The sensors 3d, 3d are connected to the controller 2a. The controller 2a decides whether windows 10, 20 are equally pressed or not, depending on the bias (the difference) of the pressures detected by the sensors 3d, 3d.

The joint 4 supports the jig 3 rotatably in the roll, pitch and yaw directions, and includes motor controlling the yaw rotation, break 4a. The break 4a limits the rotation of the joint 4. Concretely, the break 4a is connected to the controller 2a, and the rotations of the joint in the roll, pitch or yaw directions are independently limited on the basis of the command from the controller 2a. The motor for controlling the pitch direction is connected to the controller 2a.

Thus the apparatus 1 is a robot with multiple degree-of-freedom, including the polyarticular robot 2 provided with the suction jig 3 through the free joint 4. In the apparatus, the robot 2, the jig 3, the joint 4 and so on serve as conveyors.

The information about the operator's operating condition (the operating force and direction, and so on) detected by the sensors 3c, 3c is transmitted to the controller 2a. The controller 2a decides the direction desired by the operator on the basis of the detected information, and controls the posture of the robot 2, controlling the action of the motors 2b, 2c.

The position map about the position information of the jig 3 is memorized to the controller 2a in advance. The position map has the plural pieces of information (the route information) about the preferable conveying routes of the conveying objects (the windows 10, 20 and so on). The controller 2a controls the jig 3 along the route on the basis of the information, and changes to control the motor 2b, 2c and the break 4a depending on the position information of the jig 3.

The vehicle-type map about the vehicle-type information is also memorized to the controller 2a in advance. The controller 2a chooses the preferable route from the position map depending on the vehicle-type of the body 11 as the assembling object to which the conveying object (the windows 10, 20 and so on) is assembled. The controller 2a changes automatically the information, for example, about the right angle assembling the windows 10, 20 to the body 11 according to the vehicle-type of the body 11.

The operation method of the apparatus 1 by the operator is described.

When the operator holds the handle 3b, and operates the handle 3b to the desired direction, the sensor 3c detects the information involving the operated direction and force, and the detected information is transmitted to the controller 2a. The controller 2a transmits the signal of driving to the motor 2b, 2c, the signal of controlling to the break 4a of the joint 4 and to the motor controlling the pitch rotation, on the basis of the transmitted information, and controls the posture of the robot 2 to convey the desired conveying position or to become the holding angle of the window.

With regard to controlling the posture of the robot 2, the motors 2a, 2b control the translation direction, the break 4a of the joint 4 or the motor for pitch rotation controls the rotation direction.

Thus, the apparatus 1 conveys the conveying object (the windows 10, 20) to the desired direction with operating the handle 3b by the operator, and autonomously cooperates with the operator, supporting the weight of the conveying object (the windows 10, 20), thereby reducing the operator's operating-burden.

[The First Mode of the Present Invention]

As the first mode of the control method of the apparatus 1, the workflow using the apparatus 1 is described, when the window 10 is assembled to the rear window frame of the hardtop-vehicle body 11 by the apparatus 1 in the vehicle manufacturing process.

Figure 2:
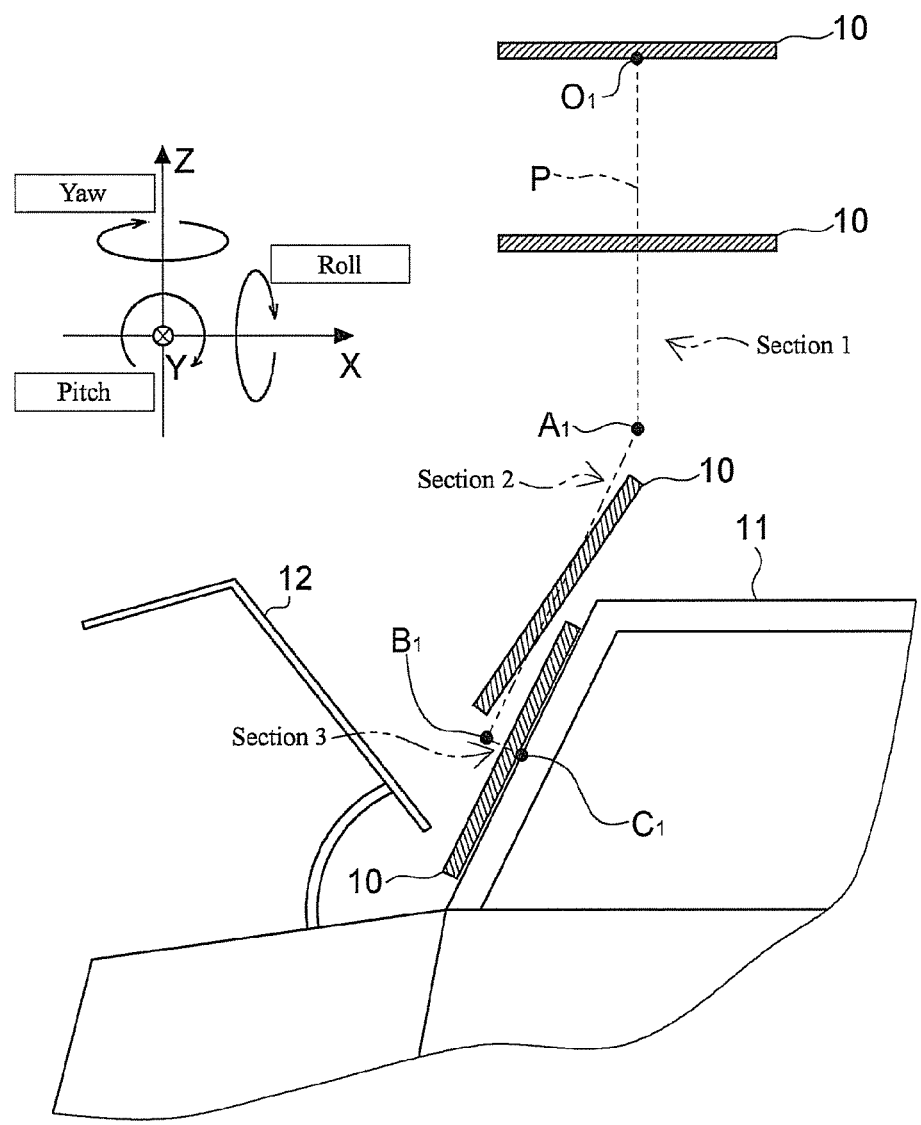
FIG. 2 is a schematic view showing a series of the workflow assembling a rear window by a power assist apparatus.

In the process assembling the rear window, a luggage hatch 12 at the back of the body 11 is opened as shown in FIG. 2, so the window 10 should be conveyed to avoid contacting the hatch 12, when the window 10 is assembled to the frame.

The apparatus 1 works in the six degrees of freedom. The reference frame of the apparatus 1 is defined as shown in FIG. 2. Viewing from the vehicle body 11 as the assembling object, the forward of the body 11 shows the X direction (plus), and the leftward with respect to the forward of the body 11 (the vehicle-traveling direction) shows the Y direction (plus) and the upward shows the Z direction (plus).

The roll direction is the counterclockwise-rotation direction toward the X (plus) direction, and the pitch direction is the counterclockwise-rotation direction toward the Y (plus) direction, and the yaw direction is the counterclockwise-rotation direction toward the Z (plus) direction.

As shown in FIG. 2, it is defined as a series of the workflow, while the window 10 positioning at the point $O_1$ is conveyed along the route P by the conveying member constructed as mentioned above and is assembled the point $C_1$ on the body 11. The route P is included in the position map as the guide route, after the conveying member holds the window 10 at the work yard stocking the windows 10, . . . 10, when the window is conveyed from the initial position (the point $O_1$) in the upper of the body 11 to the rear window frame (the point $C_1$) on the body 11 through the position (the point $A_1$ and $B_1$) where changing the angle of conveying, the control of conveying or the like. The route P is changed on the basis of the vehicle-type map.

The points $O_1$, $A_1$, $B_1$, $C_1$, are set on the route P as mentioned above, the section between the point $O_1$ and $A_1$ is defined as "the section 1", the section between the point $A_1$ and $B_1$ is defined as "the section 2", and the section between the point $B_1$ and $C_1$ is defined as "the section 3".

The controller 2a decides which section the jig 3 positions on the basis of the position map memorized therein in advance.

In the embodiment, the series of the workflow is divided into the three sections as "the section 1 to 3", however the dividing position or the number of the section is not especially limited.

In the embodiment, the apparatus 1 is used in the six degrees of freedom as the X, Y, Z direction, and roll, pitch, yaw direction, however the number of the degree of freedom is not especially limited.

[The Control Action in the Section 1]

As shown in FIGS. 2 and 3, in "the section 1", the apparatus 1 automatically controls only the translation in the X direction, the operator's operation (the input) is canceled in the translation in the Y and Z direction.

"Canceling the operator's operation (the input)" means as follows: when the sensor 3c detects information involving the operated direction and force, the signal of driving on the basis of the information detected of the sensor 3c is not transmitted to motor 2b, 2c, and the posture control of the robot 2 is not performed. In the roll, pitch and yaw direction, according to the joint 4 fixed by the break 4a, the operator's operation is canceled and the rotation of each rotational direction can not work.

In "the section 1", the window 10 is automatically conveyed down to the end point of "the section 1", that is the initial point of "the section 2", without operator's operation.

In the moment conveying from "the section 1" to "the section 2" (the point $A_1$), stopping the action of the apparatus 1 momentary, the operator is informed of moving-off of the section.

[The Control Action in the Section 2]

As shown in FIGS. 2 and 3, in "the section 2", the apparatus 1 continues to control the translation in the Z direction. In the translation in the X direction, the apparatus 1 autonomously works depending on operator's operation (the operated force and direction, detected by the sensor 3c). In the translation in the Y direction, the canceling is continued.

The apparatus 1 autonomously controls the rotation in the pitch direction, so the window 10 is rotated to become the preferable angle (fitting nearly to the inclination of the body). According to the vehicle type information memorized in the controller 2a, controlling the pitch rotation of the joint 4 depending on the vehicle type, the conveying angle of the window 10 is adjusted.

In the roll and yaw rotations, according to the break 4a, the apparatus 1 continues to cancel the operator's operation, and the rotations in these directions are canceled.

In "the section 2", the operator operates only the X direction translation, and the window 10 is semi-automatically conveyed to the end point of "the section 1", that is the initial point of "the section 2".

In the moment conveying from "the section 2" to "the section 3" (the point $B_1$), stopping the action of the apparatus 1 momentary, the operator is easily informed of moved-off of the section.

[The Control Action in the Section 3]

As shown in FIG. 3, in "the section 3", the operator's operation is permitted (the motors 2b, 2c are controlled depending on the operated force and direction, detected by the sensor 3c) and the break 4a is released, the operator operates all directions in translating (X, Y, Z directions) and rotating (roll, pitch, yaw directions).

In "the section 3", the operator performs accurate positioning of the window smoothly depending on operator's experience and institution.

In the process before "the section 3", the apparatus 1 semi-automatically conveys to the near assembling position (the point $B_1$) without operator's attention such as contacting the window 10 to the body 11, the hatch 12, so the operator sets his mind on positioning of the window in "the section 3". Thus, the spiritual burden of the operator is reduced.

[The Second Mode of the Present Invention]

As the second mode of the control method of the apparatus 1, the workflow using the apparatus 1 is described, when the window 20 is assembled to a front window frame (not shown) of a vehicle body 21 by the apparatus 1 in the vehicle manufacturing process.

Figure 4:
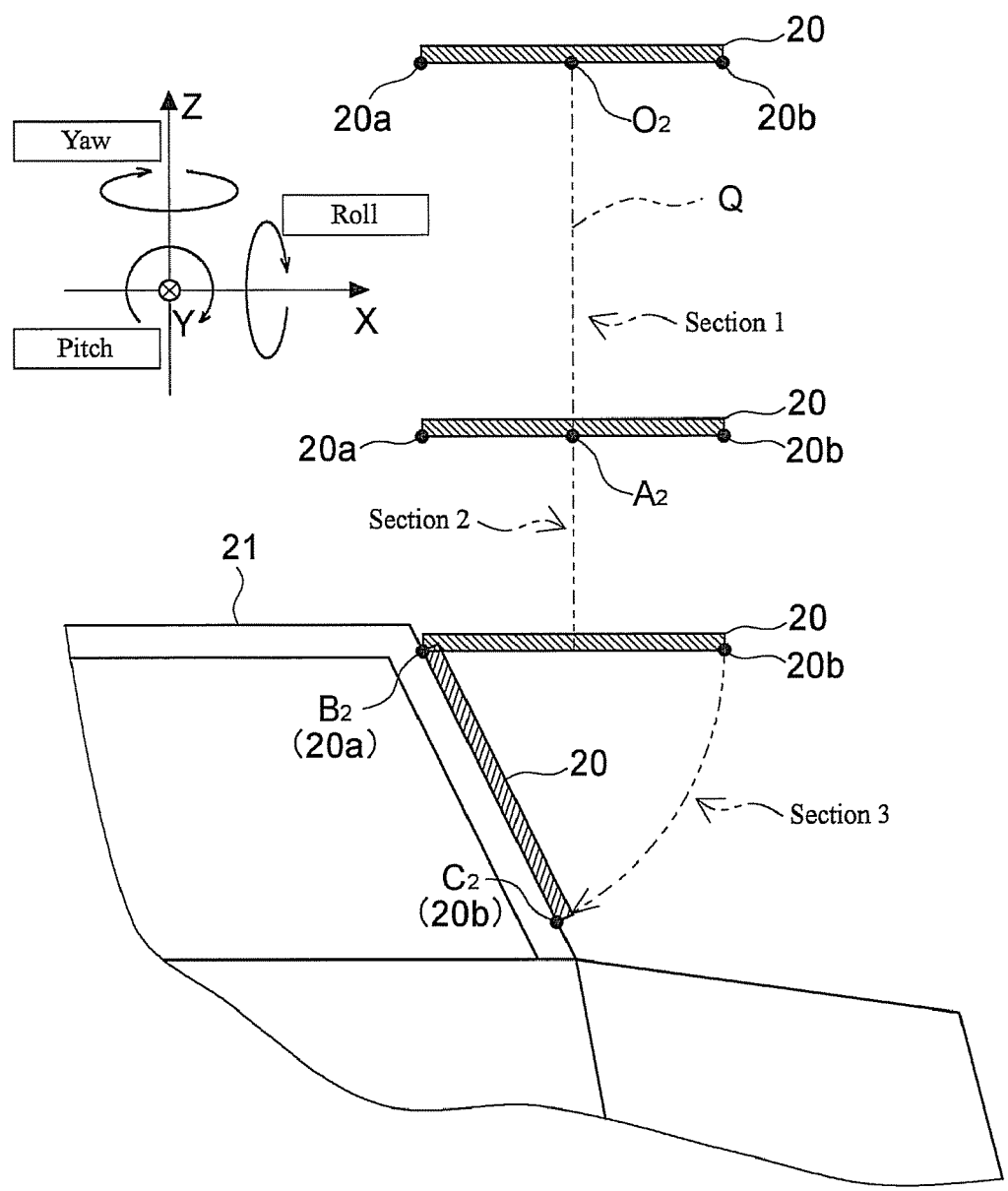
FIG. 4 is a schematic view showing a series of the workflow assembling a front window by a power assist apparatus.

In the process assembling the front window, as shown in FIG. 4, when the window 20 is assembled to the frame of the body 21, keeping on contacting the window 20 (the upper-end 20a) to the upper-end frame (the point $B_2$), the window 20 is rotated in the pitch direction to be assembled.

The reference frame of the apparatus 1 is defined as shown in FIG. 4. Viewing from the vehicle body 21 as the assembling object, the forward of the body 21 shows the X direction (plus), and the leftward with respect to the forward body 21 (vehicle traveling direction), and the upward shows the Z direction (plus).

The roll direction is the counterclockwise-rotation direction toward the X (plus) direction, and the pitch direction is the counterclockwise-rotation direction toward the Y (plus) direction, and the yaw direction is the counterclockwise-rotation direction toward the Z (plus) direction.

As shown in FIG. 4, it is defined as a series of the workflow task, while the window 20 positioning at the point $O_2$ is conveyed along the route P by the conveying member constructed as mentioned above and is assembled the point $C_2$ on the body 21. The route P is included in the position map, and is the guide route, after the conveying member holds the window 20 at the work yard stocked the window 20, ... 20, when the window is conveyed from the initial position (the point $O_2$) in the upper of the body 21 to the rear window frame (the point $C_2$) on the body 21 through the position (the point $A_2$ and $B_2$) where changing the angle of conveying, the control of conveying and so on. The route P is changed on the basis of the vehicle-type map.

Mentioned above, the points $O_2$, $A_2$, $B_2$, $C_2$, is set on the way P, the section between the point $O_2$ and $A_2$ is defined as "the section 1", and the section between the point $A_2$ and $B_2$ is defined as "the section 2", and the section between the point $B_2$ and $C_2$ is defined as "the section 3". At the point $B_2$, the controller 2a controls the position depending on the position map on the basis of the upper-end 20a of the window 20. At the point $C_2$, the controller 2a controls the position depending on the position map on the basis of the lower-end 20b of the window 20. The position control depending on the position map by the controller 2a is based on the lower-end 20b of the window 20.

The controller 2a decides which section the jig 3 positions on the basis of the position map memorized in the controller 2a in advance.

In the embodiment, the series of the workflow task is divided into the three sections as "the section 1", "the section 2" and "the section 3", however the divided position or number of the workflow section is not especially limited.

In the embodiment, the apparatus 1 is used in the six degrees of freedom as the X, Y, Z direction, and roll, pitch, yaw direction, however the degrees number of freedom is not especially limited.

[The Control Action in the Section 1]

As shown in FIGS. 4 and 5, in "the section 1", the apparatus 1 automatically controls only the translation in the X direction, the operator's operation (the input) is canceled in the translation in the Y and Z direction. In the roll, pitch and yaw direction, due to the joint 4 fixed by the break 4a, the operator's operation is canceled and the rotations in the roll, pitch and yaw direction do not work.

In "the section 1", the window 20 is automatically conveyed down to the end point of "the section 1", that is the initial point of "the section 2", without operator's operation.

In the moment conveying from "the section 1" to "the section 2" (the point $A_2$), due to the stopping the action of the apparatus 1 momentary, the operator is informed of moved-off of the section.

[The Control Action in the Section 2]

As shown in FIGS. 4 and 5, in "the section 2", the apparatus 1 autonomously works depending on the operator's operation in the translation in the X and Z direction. In the translation in the Y direction, the canceling is continued.

The apparatus 1 autonomously controls the rotation in the pitch direction, and the window 20 is rotated to become the preferable angle (fitting nearly to the incline of the body).

In the roll and yaw directions, the window is freely rotatable, so the operator can control the window 20 to transfer to the desired direction against the apparatus 1, rotating the window 20 in the roll or pitch direction.

The operator sets the standard position in the window 20 (the upper-end 20a) to the point $B_2$ of the body 21. For example, the two upper sensors 3d, 3d detects that the setting is finished, and the workflow section in the apparatus moves from the section 2 to the section 3 on the basis of the detected information.

Thus, the end point of the workflow section can be defined on the basis of the input information detected by the sensors, the switch (on/off), or the like, as well as of the position information.

In "the section 2", the window 20 is semi-automatically conveyed by the operator's operation with assist of the apparatus 1, while the upper-end 20a of the window 20 is set to the point $B_2$, that is the end position of the section 2 and initial point of the section 3.

[The Control Action in the Section 3]

As shown in FIGS. 4 and 5, in "the section 3", the operation is canceled in the translation (X, Y, Z directions). So, the setting position of the window 20 has no variation. The operator controls the rotation in the pitch direction with assist of the apparatus 1.

Concretely, in the rotation in the pitch direction, the posture of the robot 2 is controlled to rotate the window 20 around the point $B_2$ with assist of the apparatus 1 (the motor for the pitch rotation disposed at the joint 4). Thus, in "the section 3", inclining the window 20, the lower-end 20b naturally meets the point $C_2$, so the operator is only to incline the window 20, adjusting the velocity, without concentrating on setting position.

In "the section 3", the lower two sensors 3d, 3d detects the lower-end 20b contacting the point $C_3$, which decides "the section 3" is finished off.

The rotation in the roll and yaw direction, according to the break 4a, the operator's operation is canceled and the window cannot be rotated in the directions.

In "the section 3", the apparatus 1 semi-automatically conveys the window 20 to the assembling position on the body 21 (the point $C_2$). So, the operator is only to adjust the velocity inclining the window 20 without concentrating on setting position or the like, thereby reducing the operator's burden.

Mentioned above, the apparatus 1 includes the robot 2, the jig 3, and the joint 4, as a conveyor, and the controller 2a for controlling the action of the conveyor, and conveys the window 10, 20 to assist the operator in conveying the window 10, 20, controlling autonomously the conveyor (the robot 2, the jig 3, the joint 4 and so on), cooperated with the operator's operation. The controller 2a of the apparatus 1 memorizes a series of the workflow as a conveying route (route P or Q), divides the route into multiple workflow sections ("the section 1", "the section 3", "the section 3"), and sets a control logic controlling directions (translate directions (X, Y, Z directions) and rotate directions (roll, yaw, pitch directions)) where the apparatus 1 works freely in the workflow sections.

Due to the above, according to dividing the workflow properly, the apparatus can be properly controlled in the section of the setting workflow where making good use of the operator's decision or experience and the workflow where the apparatus is desired to assist, thereby reducing the operator's burden of conveying and setting the work.

Thus, a power assist apparatus and its control method can be provided, enabled to reduce the operator's working burden and to improve the setting precision and the workability.

The control logic includes permissions whether the operator's operation is canceled and whether autonomous action of the apparatus 1 is canceled.

Due to the above, the simple logic can properly limit the directions where the operator adjusts by the section by the direction where the apparatus 1 works freely.

The apparatus 1 includes the motors 2b, 2c of the robot 2 and break 4a limiting the rotation of the joint 4 as a limit device for limiting the direction the conveyor works freely depending on the operator's operation, connect the motors 2b, 2c and the break 4a to the controller 2a, and controls the motors 2b, 2c or the break 4a by the controller 2a, by the direction where the apparatus 1 works freely.

Due to the above, the simple logic can properly limit the apparatus 1 working in directions where the operator need not adjust by the section by the direction where the apparatus 1 works freely. So, the operator concentrates on adjusting the direction where only the operator can adjust, thereby the setting workflow is efficiently performed.

INDUSTRIAL APPLICABILITY

The present invention is applicable in the control technology of a power assist apparatus, assisting an operator in conveying and setting a work.

The invention claimed is:

1. A power assist apparatus, comprising:
a conveyor for holding and conveying a workpiece;
a limiting device that is capable of limiting the freedom-of-movement of the conveyor; and
a controller that autonomously controls the conveyor in cooperation with an operator's operation of the conveyor and controls the limiting device;
wherein the controller stores a route for the conveyor to convey the workpiece, wherein the route is divided into multiple workflow sections and each workflow section sets one or more directions in which the conveyor has freedom-of-movement.

2. The power assist apparatus according to claim 1, wherein the apparatus can move the workpiece in X, Y, and Z translation directions and roll, pitch, and yaw rotation directions, and wherein the route comprises:
a first workflow section in which the X and Y translation movements are limited; the roll, pitch, and yaw rotation movements are limited; and the Z translation movement is automatically performed by the apparatus; and
a second workflow section in which the Y translation movement is limited; the roll and yaw rotation movements are limited; the X translation movement is under the operator's control with power assist; the Z translation movement is automatically performed by the apparatus; and the pitch rotation movement is automatically performed by the apparatus.

3. The power assist apparatus according to claim 2, wherein the route further comprises a third workflow section in which the X, Y, and Z translation movements are under the operator's control; and the roll, pitch, and yaw rotation movements are under the operator's control.

4. The power assist apparatus according to claim 2, wherein the route further comprises a third workflow section in which the X, Y, and Z translation movements are limited; the roll and yaw rotation movements are limited; and the pitch rotation movement is under the operator's control with power assist.

5. A method of controlling a power assist apparatus that holds and autonomously conveys a workpiece in cooperation with an operator's operation, wherein the power assist apparatus comprises pads for suctioning the workpiece, a joint that supports the pads and can work freely in multiple directions, and a supporter that supports the pads through the joint and can work freely in multiple directions, the method comprising:
dividing a route for conveying the workpiece into multiple workflow sections and memorizing the divided workflow sections; and
applying a control logic that sets the freedom-of-movement for the joint and the supporter for each workflow section.

6. The method according to claim 5, wherein the control logic includes permissions to cancel either the operator's operation or the autonomous action of the power assist apparatus.

7. The method according to claim 5, wherein the apparatus can move the workpiece in X, Y, and Z translation directions and roll, pitch, and yaw rotation directions, and wherein the route comprises:

a first workflow section in which the X and Y translation movements are limited; the roll, pitch, and yaw rotation movements are limited; and the Z translation movement is automatically performed by the apparatus; and a second workflow section in which the Y translation movement is limited; the roll and yaw rotation movements are limited; the X translation movement is under the operator's control with power assist; the Z translation movement is automatically performed by the apparatus; and the pitch rotation movement is automatically performed by the apparatus.

8. The method according to claim 7, wherein the route further comprises a third workflow section in which the X, Y, and Z translation movements are under the operator's control; and the roll, pitch, and yaw rotation movements are under the operator's control.

9. The method according to claim 7, wherein the route further comprises a third workflow section in which the X, Y, and Z translation movements are limited; the roll and yaw rotation movements are limited; and the pitch rotation movement is under the operator's control with power assist.

\* \* \* \* \*